US010977247B2

(12) United States Patent
Ground, Jr. et al.

(10) Patent No.: US 10,977,247 B2
(45) Date of Patent: Apr. 13, 2021

(54) COGNITIVE ONLINE MEETING ASSISTANT FACILITY

(71) Applicant: INTERNATIONAL BUSINESS MACHINES CORPORATION, Armonk, NY (US)

(72) Inventors: James C. Ground, Jr., Wappingers Falls, NY (US); David F. Hans, Castleton, NY (US); Kirsten B. McDonald, Poughkeepsie, NY (US); Ronald E. Van Buskirk, II, Nederland, CO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 842 days.

(21) Appl. No.: 15/356,826

(22) Filed: Nov. 21, 2016

(65) Prior Publication Data
US 2018/0144235 A1    May 24, 2018

(51) Int. Cl.
*G06F 16/2452*    (2019.01)
*G06Q 10/10*    (2012.01)
*G06N 5/04*    (2006.01)

(52) U.S. Cl.
CPC ......... *G06F 16/24522* (2019.01); *G06N 5/04* (2013.01); *G06Q 10/10* (2013.01)

(58) Field of Classification Search
CPC ................................................ G06F 16/24522
See application file for complete search history.

(56) References Cited

U.S. PATENT DOCUMENTS 7,603,330 B2 * 10/2009 Gupta .................... G06N 20/00
706/20
7,809,664 B2    10/2010 Heck
(Continued)

FOREIGN PATENT DOCUMENTS

CN    101520802 A    9/2009
CN    101630312 A    1/2010
(Continued)

OTHER PUBLICATIONS

Moschitti et al., "A Novel Approach to Focus Identification in Question/Answering Systems", In: HLT-NAACL Workshop on Pragmatics of Question Answering (2004). (Year: 2004).*
(Continued)

*Primary Examiner* — Alexey Shmatov
*Assistant Examiner* — Beatriz Ramirez Bravo
(74) *Attorney, Agent, or Firm* — Edward Wixted, Esq.; Kevin P. Radigan, Esq.; Heslin Rothenberg Farley & Mesiti P.C.

(57) ABSTRACT

A cognitive meeting assistant facility is provided for assisting a moderator in an online meeting. The cognitive meeting assistant facility automatically categorizes chat questions of participants of the online meeting based on content into multiple categories of chat questions. One or more categories of chat questions of the multiple categories of chat questions include multiple questions of different participants of the online meeting. Further, the cognitive meeting assistant facility deploys the multiple categories of chat questions for display to the participants of the online meeting. The deploying includes, for each category of the at least one category of chat questions, providing a category-applicable answer for display to the participants of the online meeting in association with that category of chat questions.

18 Claims, 10 Drawing Sheets

(56) References Cited

U.S. PATENT DOCUMENTS

| | | | | |
|---|---|---|---|---|
| 8,160,912 | B2* | 4/2012 | Denner | G06Q 10/06 |
| | | | | 705/7.19 |
| 8,666,730 | B2 | 3/2014 | Todhunter et al. | |
| 8,739,046 | B2* | 5/2014 | Sloyer | G06Q 10/10 |
| | | | | 348/14.08 |
| 8,874,648 | B2* | 10/2014 | Beerse | G06Q 10/00 |
| | | | | 709/204 |
| 8,903,712 | B1 | 12/2014 | Tremblay et al. | |
| 9,053,500 | B2* | 6/2015 | Etesse | G06Q 30/06 |
| 9,064,001 | B2* | 6/2015 | Liu | G10L 15/1815 |
| 9,275,038 | B2 | 3/2016 | Beirner et al. | |
| 9,348,900 | B2 | 5/2016 | Alkov et al. | |
| 2008/0294637 | A1* | 11/2008 | Liu | G06Q 30/02 |
| 2009/0162824 | A1* | 6/2009 | Heck | G06N 3/004 |
| | | | | 434/322 |
| 2010/0223345 | A1* | 9/2010 | Gupta | G06Q 10/109 |
| | | | | 709/206 |
| 2012/0226984 | A1* | 9/2012 | Bastide | G06Q 10/107 |
| | | | | 715/730 |
| 2013/0006973 | A1* | 1/2013 | Caldwell | G06F 16/345 |
| | | | | 707/723 |
| 2013/0144890 | A1* | 6/2013 | Liu | G06F 16/35 |
| | | | | 707/749 |
| 2014/0255895 | A1* | 9/2014 | Shaffer | G09B 7/02 |
| | | | | 434/350 |
| 2016/0073056 | A1 | 3/2016 | Katzman et al. | |
| 2016/0073059 | A1 | 3/2016 | Bader-Natal et al. | |
| 2016/0105566 | A1* | 4/2016 | Klemm | H04M 3/565 |
| | | | | 379/202.01 |
| 2018/0129734 | A1* | 5/2018 | Iwama | G06F 16/24522 |

FOREIGN PATENT DOCUMENTS

| | | | |
|---|---|---|---|
| CN | 104679815 A | * | 6/2015 |
| WO | WO2016014269 A1 | | 1/2016 |
| WO | WO2016037084 A1 | | 3/2016 |

OTHER PUBLICATIONS

Moschitti et al., "A Novel Approach to Focus Identificaiton in Question/Answering Systems", 2004. (Year: 2004).*

Zhang, Dell et al., "Question Classification Using Support Vector Machines," SIGIR'03, Jul. 2003, pp. 1-7.

Mell et al., "The NIST Definition of Cloud Computing", National Institute of Standards and Technology, U.S. Dept. of Commerce, NIST Special Publication 800-145 (Sep. 2011) (7 pages).

IBM, "z/Architecture Principles of Operation," IBM® Publication No. SA22-7832-10, Eleventh Edition, Mar. 2015, pp. 1-1732.

IBM, "Power ISA™ Version 2.07B," International Business Machines Corporation, Apr. 9, 2015, pp. 1-1527.

Paranjpe, Deepa, "Clustering Semantically Similar and Related Questions," Stanford University, (no date information available).

\* cited by examiner

Guest Speaker
Discussing topic: Creating a new Sponsor User Program

| Question | TimeStamp |
|---|---|
| Where do I find the charts? | 09:00 |
| Are there global considerations? | 09:05 |
| Are there any legal requirements? | 09:08 |
| I just joined, where are the charts? | 09:09 |
| Are we going to address different customer issues ? | 09:10 |
| How do I share the charts with someone else? | 09:12 |
| I have the same problem with customers in Canada, who can I contact? | 09:12 |
| Does this question refer to worldwide customers? | 09:15 |
| Do we need to engage our legal teams in the review process for sponsor users? | 09:20 |
| Do we track customer feedback as well? | 09:25 |
| I have customer across US and Europe, can I use this process? | 09:30 |

FIG. 3A

Option 1:
Learn from answers, group similar questions and create unique windows

| Question | TimeStamp |
|---|---|
| Where do I find the charts? | 09:00 |
| Are there global considerations? | 09:05 |
| Are there any legal requirements? | 09:08 |
| I just joined, where are the charts? | 09:09 |
| Are we going to address different customer issues ? | 09:10 |
| How do I share the charts with someone else? | 09:12 |
| I have the same problem with customers in Canada, who can I contact? | 09:12 |
| Does this question refer to worldwide customers? | 09:15 |
| Do we need to engage our legal teams in the review process for sponsor users? | 09:20 |
| Do we track customer feedback as well? | 09:25 |
| I have customer across US and Europe, can I use this process? | 09:30 |

Facility recognizes similar topic area and groups or creates stream with similar questions. So Moderator, participants, or facility can more easily access or respond.

Facility creates a separate Q/A window for Global Customer questions and uses built in , learned intelligence to provide response.

Step 1 – Participant A asks questions about global issues. Moderator responds to question.
Step 2 – Participant B asks questions about customers in specific country. Facility recognizes response as being a "global" issue and groups response for Participant B with response for Participant A
Step 3 – Participant C asks questions about different geo areas, and facility recognizes question and provides a learned response to question.

FIG. 3B

Guest Speaker
Discussing topic: Create a new Sponsor User Program

| | Question | TimeStamp |
|---|---|---|
| (2 more) ▲ | Vidya: Where do I find the charts? (Answered!) | 09:00 |
| | Watson: The charts are located at http://ibm.biz/abc123 | 09:05 |
| (3 more) ▼ | Zoe: Are there global considerations? (Answered!) | 09:05 |
| | Geoff: I have the same problem with customers in Canada, who can I contact? | 09:12 |
| | ● Me: Does this question refer to worldwide customers? | 09:15 |
| | Bill: I have customers across US and Europe, can I use this process? | 09:30 |
| | Moderator: This applies to all customers, except those in Nepal | 09:07 |
| | Jodi: Are there any legal requirements? | 09:08 |
| | Zoe: Are we going to address different customer issues? | 09:10 |
| | Geoff: Do we need to engage our legal teams in the review process for sponsor users? | 09:20 |
| | Bill: Do we track customer feedback as well? | 09:25 |

Questions automatically clustered

Users can see question/answer pairs by default. They can also expand to see all questions Users have their own questions highlighted and can move them in and out of clusters Answered questions go to the top Watson answers questions that it can guess above a certain confidence level

FIG. 3C

Summary Slide

| Questions | Answers |
|---|---|
| Where do I find the charts?<br>How do I share the charts with someone else?<br>I just joined, where are the charts? | Watson: The charts are located at http://ibm.biz/abc123 |
| Are there global considerations?<br>I have the same problem with customers in Canada, who can I contact?<br>Does this question refer to worldwide customers?<br>I have customers across US and Europe, can I use this process? | Moderator: This applies to all customers, except those in Nepal |
| Are we going to address different customer issues? | Moderator: The initial release is a one-size-fits-all solution. Future releases will be customized |
| Are there any legal requirements?<br>Do we need to engage our legal teams in the review process for sponsor users? | Moderator: This has been fully reviewed by corporate legal |
| Do we track customer feedback as well? | Moderator: Not yet |

FIG. 3D

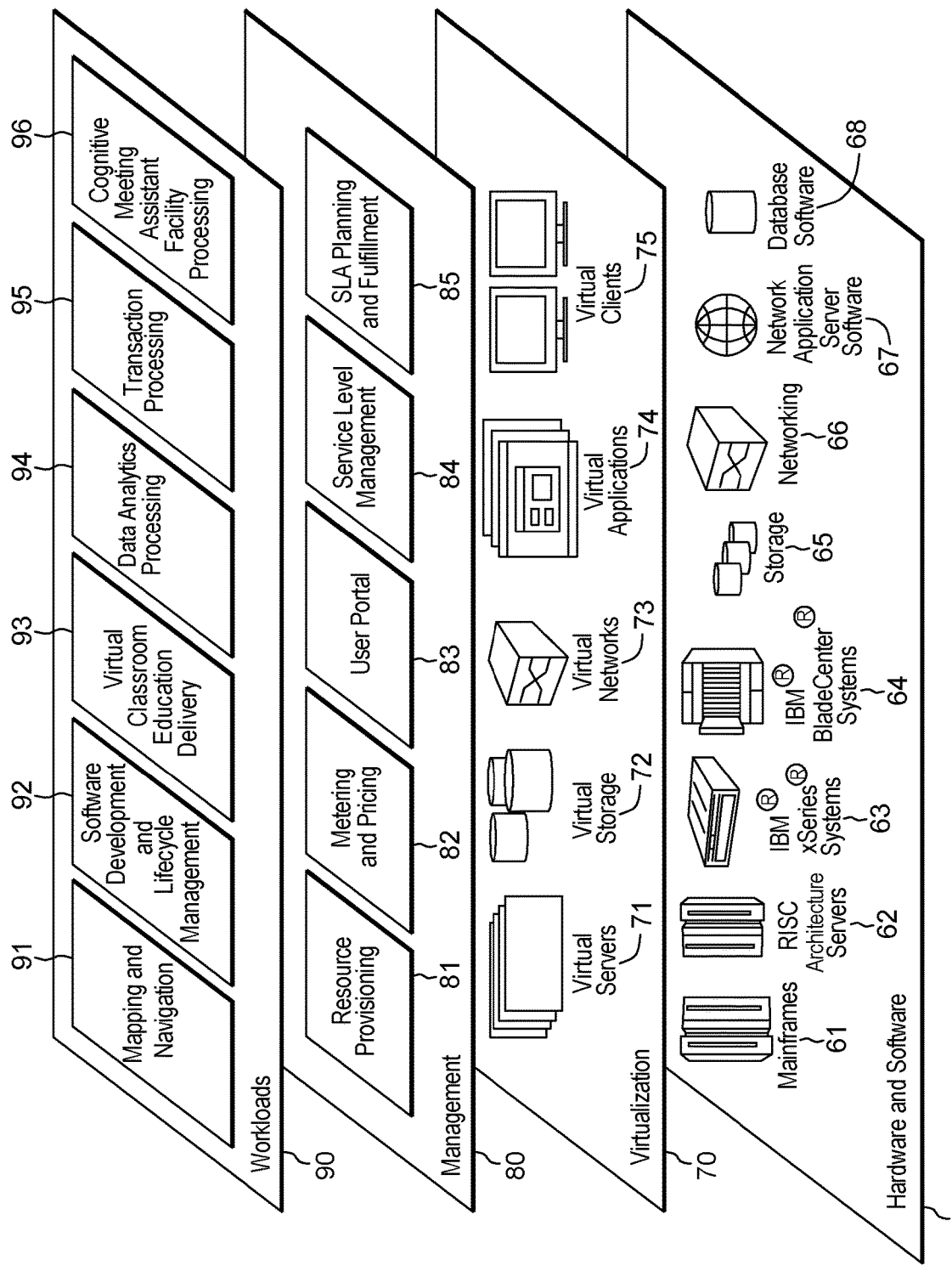

COGNITIVE ONLINE MEETING ASSISTANT FACILITY

BACKGROUND

In an online meeting or chat, where tens or even hundreds of participants or users are streaming comments and questions, for instance, as part of a web-user interface for online education, the same question may be asked repeatedly in the same or different form. A moderator, or other participant, can answer the question, but the answer may quickly scroll off the participants' screens as new participants join the chat and ask the same, or other questions, again and again, because they haven't scrolled through the possible hundreds of prior chat messages to see if the question has already been answered. In environments such as these, the moderator can become overwhelmed with questions, and the participants can find it difficult to find the correct answers. This can also impact the value of the session for the moderator, since the moderator may become distracted trying to answer questions and playing catch-up. Further, based on the rolling comments in the chat windows, providing a quality summary of comments upon completion of the meeting may be difficult, if not impossible.

SUMMARY

Shortcomings of the prior art are overcome and additional advantages are provided through the provision of a computer-implemented method which includes, for instance, categorizing chat questions of participants of the online meeting based on content into multiple categories of chat questions. At least one category of chat questions of the multiple categories of chat questions includes multiple questions of different participants of the online meeting. The method further includes deploying the multiple categories of chat questions for display to the participants of the online meeting. The deploying includes, for each category of the at least one category of chat questions of the multiple categories of chat questions, providing a category-applicable answer for display to the participants of the online meeting in association with that category of chat questions.

Systems and computer program products relating to one or more aspects are also described and claimed herein. Further, services relating to one or more aspects are also described and may be claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 3A depicts an exemplary display of chat questions in an online meeting in connection with which a cognitive meeting assistant facility may be used, in accordance with one or more aspects of the present invention;

FIG. 3B depicts the online meeting display of FIG. 3A, with the cognitive meeting assistant facility categorizing chat questions of participants of the online meeting based on content into one or more categories of chat questions, in accordance with one or more aspects of the present invention;

FIG. 3C depicts the online meeting display example of FIGS. 3A & 3B, with the cognitive meeting assistant facilitating deploying multiple categories of chat questions for display to the participants of the online meeting, along with category-applicable answers where available, in accordance with one or more aspects of the present invention;

FIG. 3D depicts an exemplary report on an online meeting where multiple categories of chat questions and category-based answers have been extracted and included in the report by the cognitive meeting assistant facility, in accordance with one or more aspects of the present invention;

FIG. 7 depicts an example of extraction model layers, which may facilitate implementing cognitive meeting assistance processing, in accordance with one or more aspects of the present invention.

DETAILED DESCRIPTION

Figure 1:
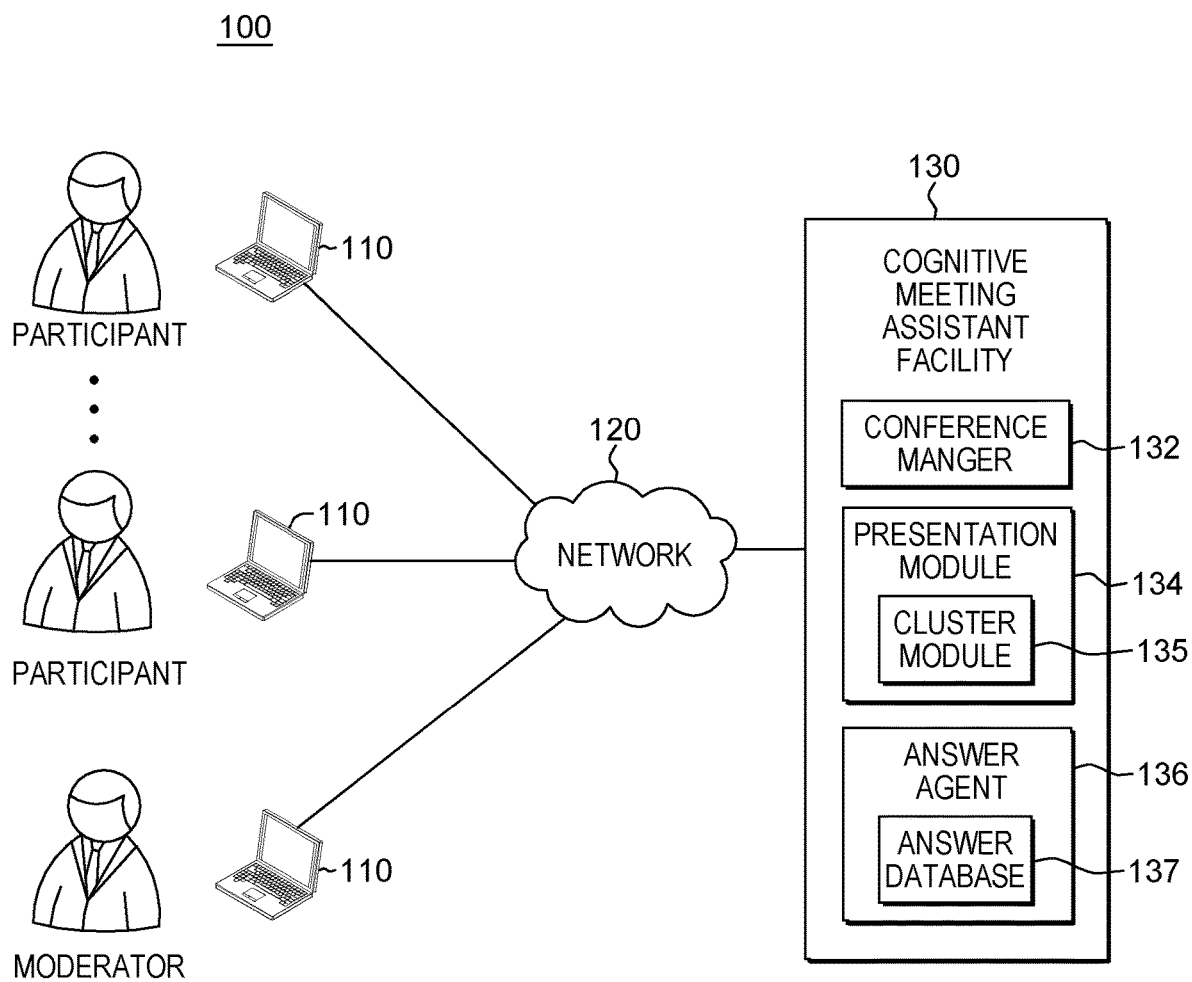
FIG. 1 depicts a schematic of one embodiment of an online meeting with a cognitive meeting assistant facility assisting in the online meeting, in accordance with one or more aspects of the present invention.

As noted above, in an online meeting (or web-based or online chat, discussion, presentation, conference, etc.), there may be tens, or even hundreds or more, participants or users streaming comments and questions, for instance, as part of a web-user interface for the online meeting. In one or implementations, the online meeting may be an online educational or business meeting, and the same questions may be asked repeatedly, in the same or different form. In environments such as these, a moderator may become overwhelmed with questions, and the participants may find it difficult to find correct answers, which may impact the value of the session for the moderator and participants. One possible solution to this problem is to have multiple people working the online meeting. One person could be presenting, while another could be monitoring the chat messages to determine questions, and answer any questions that might require immediate response. However, such an approach requires two or more people per meeting, or presentation, and it may even overwhelm the multiple moderators should the amount of questions be high. Also, committing multiple people to a single online meeting requires additional resources, and incurs additional costs.

Therefore, in accordance with one or more aspects, a computer-implemented method, system, and computer program product are disclosed herein providing cognitive meeting assistance to an online meeting, for instance, via a cognitive meeting assistant facility which automatically: categorizes or groups chat questions of participants of the online meeting based on content into multiple categories of chat questions, with at least one category of chat questions of the multiple categories of chat questions including multiple questions from different participants of the online meeting.

This categorizing represents one mode of processing provided in support of the online meeting (e.g., eMeeting). By way of example, questions may be clustered into different streams of similar questions. For example, one stream might include questions like "Where are the charts?", "Has anyone posted charts for this?", and "Where can I download the PowerPoint™ for this?" Another stream of chat questions such as "How can we enhance the search capabilities of KC?", or "What types of SEO are available to improve search?" Either a moderator or participants may flag answers to each stream as a best answer. Further, a moderator or participants can move questions to different streams if they have been misclassified.

As part of this mode, the cognitive meeting assistant facility may deploy the multiple categories of chat questions for display to participants of the online meeting. The deploying may include, for each category of the at least one category of chat questions of the multiple categories of chat questions, providing a category-applicable answer for display to the participants of the online meeting in association with that category of chat questions. In this manner, the moderator and participants can view the categories, the questions within the categories, as well as any provided answers to the questions within the categories, and as noted, where applicable, identify a best answer, indicating that the best answer is the category-applicable answer for the particular category. Further, the moderator or participants may move displayed questions between categories or streams if they are misclassified. Once the meeting concludes, the categories or streams may be provided in a report so that a moderator can provide a comprehensive meeting summary.

In another mode, which may run simultaneous with the above-noted mode, the cognitive meeting assistant facility may include an answer agent which scans the online meeting, and in particular, the chat messages for questions that the answer agent may answer. The answer agent references a knowledge base including answers to known questions that may have been set up ahead of time, for instance, by the moderator. If the answer agent has a high enough confidence level in an answer, it may provide the answer to the participant, as well as provide the answer as the category-applicable answer for a cluster of questions.

In general, provided herein are computer-implemented methods, systems, and computer program products for providing cognitive meeting assistance in an online meeting. By way of example, the computer-implemented method may include providing a cognitive meeting assistant facility for assisting in an online meeting. The cognitive meeting assistant facility automatically: categorizes chat questions of participants of the online meeting based on content into multiple categories of chat questions, at least one category of chat questions for the multiple categories of chat questions including multiple questions of different participants of the online meeting. Further, the facility automatically deploys the multiple categories of chat questions for display to the participants of the online meeting. The deploying may include, for each category of the at least one category of chat questions of the multiple categories of chat questions, providing a category-applicable answer for display to the participants of the online meeting in association with that category of chat questions.

In one or more implementations, the categorizing by the cognitive meeting assistant facility may include processing text of a chat question of the online meeting to determine whether the chat question can be clustered with one or more chat questions in an existing category of chat questions. Where it is determined that the chat question can be clustered within an existing category, the facility further places the chat question into the existing category of chat questions.

In one or more embodiments, the category-applicable answer is a single category-applicable answer for display to the participants of the online meeting within the respective category of chat questions. Further, in one or more implementations, deploying the multiple categories of chat questions for display to participants of the online meeting may include providing, for each category of the at least one category of chat questions, the associated single category-based answer for display, for instance, near the top of or in another manner set off from, the chat questions of that category of chat questions.

In one or more embodiments, the cognitive meeting assistant facility may automatically determine for each category of the at least one category, the category-applicable answer for display to the participants of the online meeting with that category of chat questions.

By way of further example, in one or more embodiments, the cognitive meeting assistant facility may further automatically: reference an answer database for a known answer to a chat question posted during the online meeting by a participant; and automatically reply to the participant with the known answer to the chat question where identified within the answer database. In such embodiments, the cognitive meeting assistant facility may further automatically identify when one or more participants answer a chat question of the online meeting which was previously unavailable in the answer database, and based on identifying the answer, may store the answer in the answer database for the chat question.

In addition, a report may be optionally generated by the cognitive meeting assistant facility. For instance, the cognitive meeting assistant facility may automatically extract one or more key words from each category of chat questions of the multiple categories of chat questions, and provide a report summarizing discussion during the online meeting which includes the multiple categories of chat questions and the category-based answers.

In one or more implementations, the embodiments disclosed herein may utilize a question and answer system trained for dynamic clustering of questions in an online meeting. As understood, a question and answer (QA) system may take an input question, analyze it, and return results indicative to the most probable answer to the input question. QA systems provide automated mechanisms for searching through large sets of resources of content, for instance, electronic documents, databases, etc., analyzing them with regard to an input question to determine an answer to the question, and a confidence measure as to how accurate the answer is for answering the input question.

One such QA system is the Watson™ system available from International Business Machines Corporation of Armonk, N.Y. The Watson™ system is an application of advanced natural language processing, information retrieval, knowledge representation and reasoning, and machine-learning technologies to the field of open domain question answering. The Watson™ system is built on IBM's®

DeepQA™ technology used for hypothesis generation, massive evidence gathering, analysis, and scoring. DeepQA™ takes an input question, analyzes it, decomposes the question into constituent parts, generates one or more hypothesis based on the decomposed question, and results of a primary search of answer resources, performs hypothesis and evidence scoring based on a retrieval of evidence from evidence sources, performs synthesis of the one or more hypothesis, and based on trained models, performs a final merging and ranking to output an answer to the input question along with (optionally) a confidence measure.

Various United States patent application publications describe various types of question and answering systems. Training of a QA system, such as the Watson™ system mentioned above, involves subjecting the system to a training operation that includes one or more runs of one or more sets of training questions. The operation and results generated by the QA system are monitored, and the configuration of the QA system is modified to improve the results generated by the QA system, for instance, data, algorithms, and/or configuration settings are modified such that the QA system answers a high percentage of the training questions accurately, where the requisite percentage of training questions accurately may be specified by one or more threshold values.

In one or more aspects, as part of the question analysis phase, the question may be analyzed to identify various features and/or attributes of the question, such as, focus, lexical answer-type (LAT), question classification (QClass), and question sections (QSections). These extracted features or attributes may be used as input to a clustering engine which clusters questions according to similar features or attributes. Based on the generated questions, subsequently submitted questions may be similarly clustered. For instance, the subsequently submitted question may be accepted as being part of a closest cluster to which the question relates.

In one or more implementations, when a new question is received, it may be clustered according to the similarity of extracted features in or attributes of the new question, with features and/or attributes of previous questions that generated the various clusters. Through this clustering, one can determine the closest cluster for the new question. If the question is deemed to overlap multiple clusters, then the question may be submitted to multiple clusters in a parallel manner. In such a case, the user or participant may be presented with multiple answers, and the participant may provide feedback as to which answer the user feels is the best answer for the question. The question may then be associated with the cluster of questions from the specific category that provided the best answer.

By way of further example, FIG. 1 depicts a block diagram of one embodiment of an online meeting environment, generally denoted 100, wherein communication devices 110 of participants and, in one or more embodiments, a moderator of the online meeting are used to communicate across a network 120, with which a cognitive meeting assistant facility 130 is associated, in accordance with one or more aspects of the invention. Note that, although shown as separate from communication devices 110, cognitive meeting assistant facility 130 may be, in one or more aspects, implemented in various places within environment 100, including within communication devices 110 of one or more of the moderator, or even the participants. The communication devices 110 may include any device that can communicate in an electronic meeting, online meeting, web chat, web meeting, etc., herein collectively referred to as an online meeting. Examples include personal computers (PC), telephones, video phones, cellular telephones, personal digital assistants (PDAs), tablet devices, laptop computers, notebook devices, smart phones, etc. Any number of communication devices may be connected to network 120, and as noted, one or more of communication devices 110 may be directly connected to cognitive meeting assistant facility 130, or the facility could reside on a separate computer system connected to network 120. As noted, there may be tens, or even hundreds or more participants to an online meeting.

Network 120 can be or include any collection of communication equipment that can send and receive electronic information, such as the Internet, a wide-area network (WAN), a local-area network (LAN), a voice-over IP network (VoIPN), the public switched telephone network (PSTN), a packet-switch network, a circuit switch network, a cellular network, a combination of these, and the like. Network 120 can use a variety of protocols, such as the Ethernet, Internet Protocol (IP), Session Initiation Protocol (SIP), Integrated Services Digital Network (ISDN), H.323, video protocols, text protocols, email protocols, etc.

Cognitive meeting assistant facility 130 may be or include any collection of communication equipment that can provide services (such as disclosed herein) via network 120, and may include one or more of a server, a proxy server, a session boarder control, a gateway, a cloud conferencing service, a conferencing system, a mixture, a router, a central office switch, etc., and/or a combination of these. In the illustrated embodiment, cognitive meeting assistant facility 130 includes (by way of example) a conference manager 132, a presentation module 134, which includes a cluster module 135, and an answer agent 136, which includes or has access to an answer database 137. Although elements 132-137 are shown within cognitive meeting assistant facility 130, elements 132-137 may be distributed across network 120. For instance, answer database 137 may be located on a server elsewhere in network 120 remote from cognitive meeting assistant facility 130.

In certain embodiments, one or more of the elements 132-137 may be distributed between cognitive meeting assistant facility 130, and the communication devices 110. For instance, parts of the conference manager 132 and the presentation module 134 may be distributed between the cognitive meeting assistant facility 130 and the communication devices 110 (e.g., in a software application running on the communication devices 110).

Conference manager 132 can be or may include any hardware and/or software that can manage services provided by cognitive meeting assistant facility 130, such as conference mixer, a conference bridge, conferencing application, and/or the like, desired in support of the online meeting.

Presentation module 134 can be or may include any hardware and/or software that can generate and/or present information to a conference participant. For example, presentation module 134 may include a web server, a software application, a display, a video card, a browser, and/or the like. Presentation module 134 may include a cluster module 135 which can be or may include any hardware and/or software that can cluster information for an online meeting. The cluster module 135 may use a variety of clustering processes to cluster information, such as k-means clustering, hierarchical clustering, density-based clustering, multivariate clustering, normal distribution clustering, bi-clustering, and/or the like. In one or more implementations, the above-noted Watson™ system available from International Business Machines Corporation could be employed in dynamically clustering chat questions of participants of an online meeting, such as described herein. In one or more other embodiments, an unsupervised text clustering algorithm may be employed at regular intervals where there are new messages posted to the chat. For instance, the k-means clustering algorithm could be employed with TF-IDF weights multiple times, with randomly-chosen cluster centers. Then, the cluster with the lowest overall error could be chosen. Afterwards, the user interface may be updated to display the appropriate clusters found. In one or more implementations, a participant has the option to view questions contained in multiple categories of chat questions provided by the cluster module.

The answer agent 136 may be a question and answer (QA) system, such as the above-noted Watson™ system, which maintains a reference and answer database 137. The answer database can be any type of database for storing information, such as a relational database, a directory service, a hierarchical database, a file system, a file and/or the like. Answer database 137 may be a single database or multiple databases distributed, for instance, between multiple cognitive meeting assistant facilities 130, and/or distributed across network 120.

Figure 2:
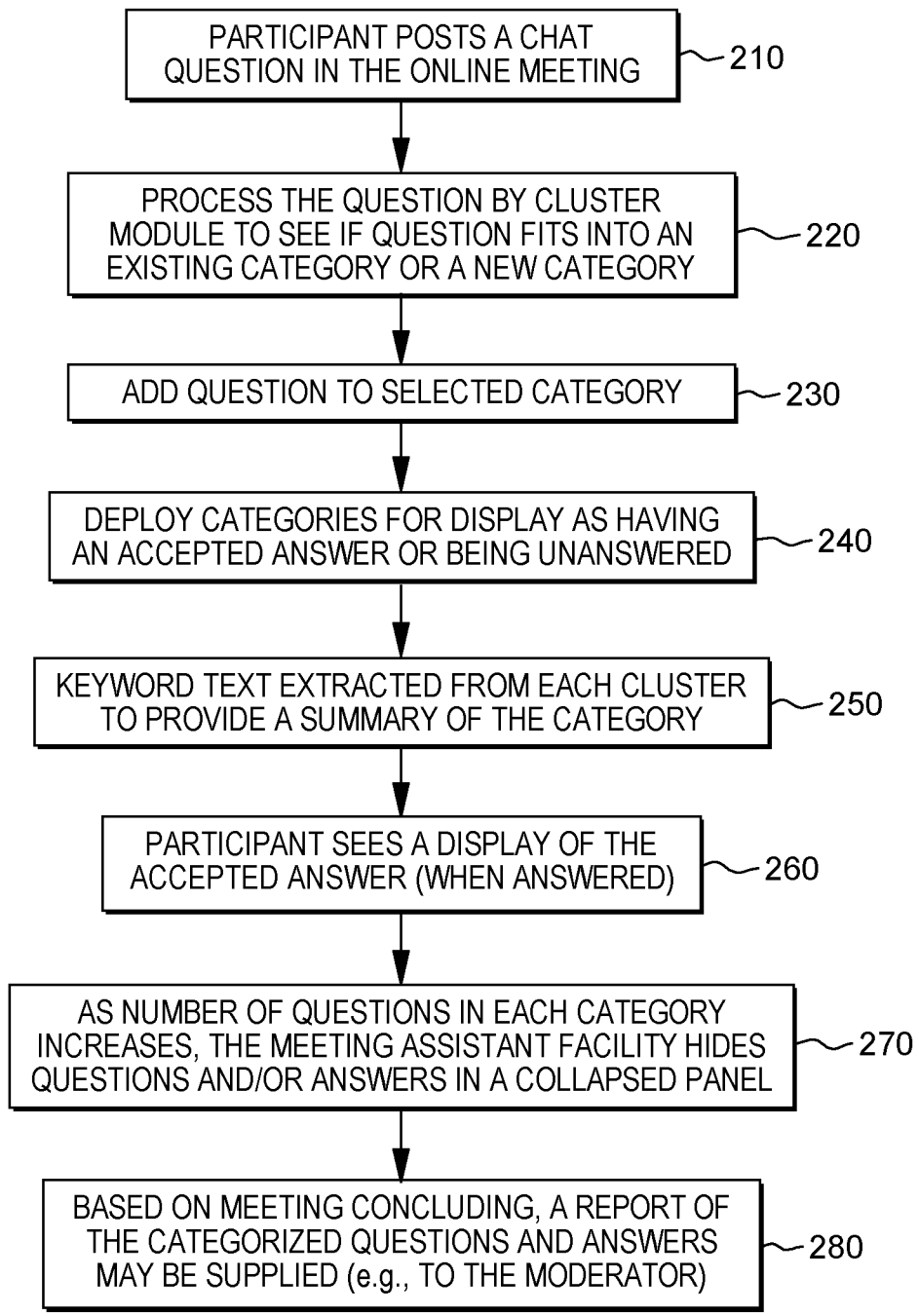
FIG. 2 depicts one embodiment of a process or mode implemented by a cognitive meeting assistant facility assisting in managing an online meeting, in accordance with one or more aspects of the present invention.

FIG. 2 depicts one embodiment of a process 200 implemented by one mode of a cognitive meeting assistant facility, in accordance with one or more aspects of the present invention. Process 200 includes participants posting chat questions in an online meeting 210. By way of example, FIG. 3A illustrates a display of an online meeting where chat questions are listed in order of receipt. In this example, the guest speaker or moderator may be discussing a topic, such as creating a new sponsor-user program.

Continuing with FIG. 2, a posted question is processed by the cluster module to see if the question fits into an existing category, or is in a new category 220. As noted, a variety of clustering processes may be used to cluster information. FIG. 3B illustrates one example of the process. In Step 1 of FIG. 3B, participant A asks a question about global issues. The moderator responds to the question. In Step 2, participant B asks questions about customers in a specific country. The cognitive meeting assistant facility recognizes the response as being a "global" issue, and groups the response for participant B with the response for participant A. This grouping creates a category or stream with similar questions to allow the moderator and participants, as well as the facility, to more easily access or respond. In Step 3, participant C asks questions about a different geographical area, and the cognitive meeting assistant facility automatically recognizes the question and provides a learned response to the question. For instance, a separate QA window may be created for the categorized questions, with built-in, learned intelligence being employed to provide the response, such as would be implemented by the Watson™ IBM® system.

Where the received question fits into an existing category, or into a new category, the cognitive meeting assistant facility adds the question to the selected category 230. Categories are then deployed for display as having an accepted answer or being unanswered 248. FIG. 3C depicts one example of this, wherein answered questions may be displayed first to participants of the online meeting. Further, a representative question of the automatically clustered questions may be depicted with the category-applicable answer. In this example, note that a cognitive meeting facility, such as the Watson™ system, has automatically answered the first question, while the second question has been answered by the moderator.

Continuing with FIG. 2, the cognitive meeting assistant facility may, in one or more embodiments, automatically extract keyword text from each cluster to provide a summary of the category, and any category-applicable answer 250. As one example, the AlchemyAPI™ key word extraction interface offered by International Business Machines Corporation of Armonk, N.Y., may be employed to find key words in text and rank the words. AlchemyAPI™ employs statistical algorithms and natural language processing technology to analyze content and identify the relevant key words. The participants see a display of the accepted answer (when answered) for a particular category 260. As the number of questions in each category increases, the cognitive meeting assistant facility may hide questions and/or answers in a collapsed panel 270. Based on the meeting concluding, a report of the categorized questions and any answers may be supplied (e.g., to a moderator) 280. One example of a summary report is depicted in FIG. 3D, where questions, as well as any category-based answers, are grouped together to facilitate, for instance, an evaluation of the discussion during the online meeting.

Those skilled in the art will understand that process 200 depicted in FIG. 2 may be, in one or more implementations, a dynamic process which continuously occurs during the online meeting, for instance, in support of the moderator. This process represents one mode of the cognitive meeting assistant facility 130 noted above.

In another mode, answers to questions are being identified and presented and/or saved during the online meeting. This further mode may run simultaneously with the main mode noted above, and may have access to the same data.

Figure 4:
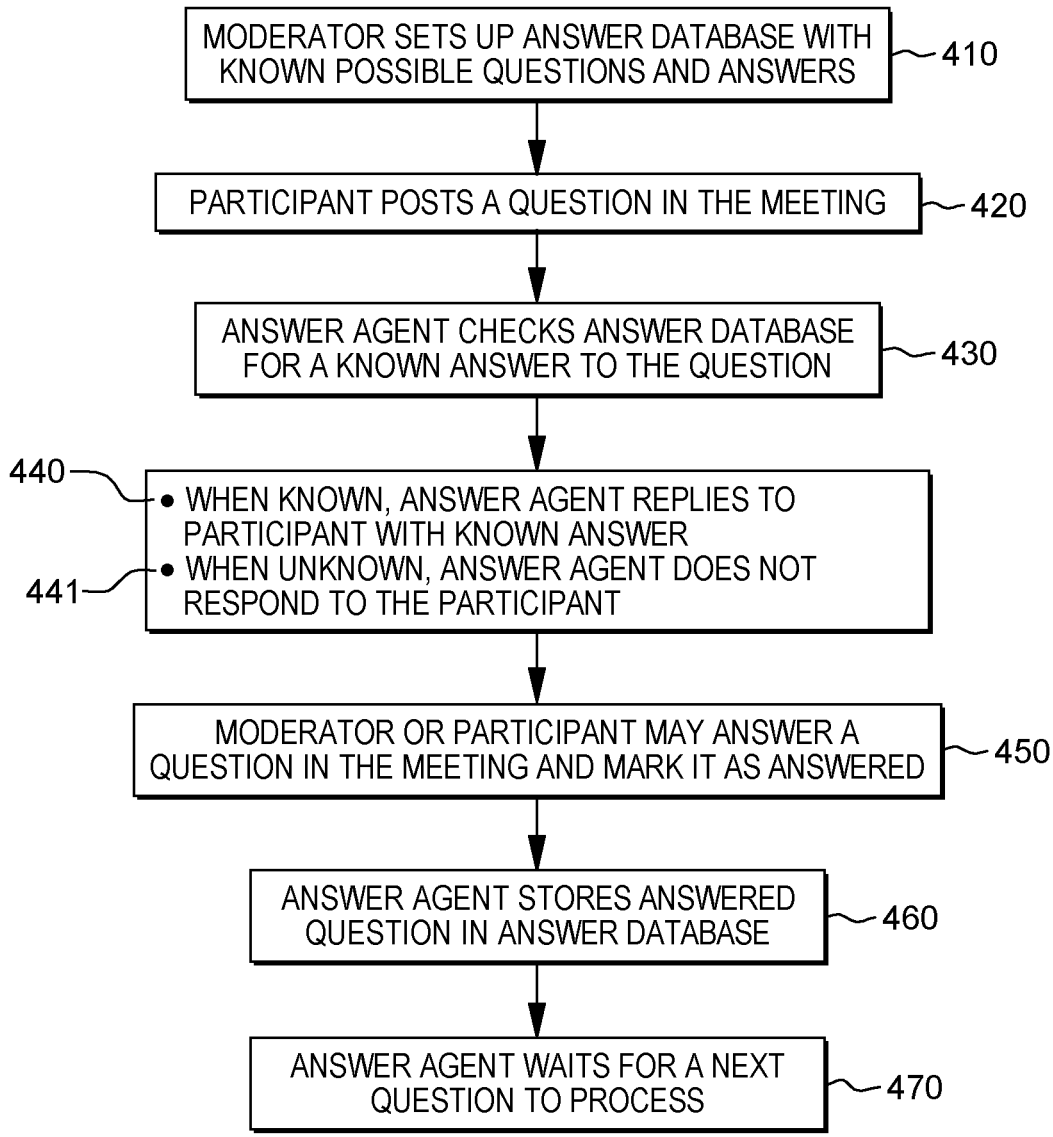
FIG. 4 depicts one embodiment of a further cognitive meeting assistant facility process or mode, where an answer agent replies to a participant with an answer when known, and retains known answers in an answer database, in accordance with one or more aspects of the present invention.

FIG. 4 illustrates one example of a process 400 of this further mode of the cognitive meeting assistant facility, which as noted, may run simultaneous with the process described above in connection with FIGS. 2-3D. In process 400, an answer database may have been previously established with known possible questions and answers, for instance, by the moderator of the online meeting 410. A participant may post a question during the meeting 420, and the answer agent may automatically determine whether the answer database provides a known answer to the question 430. When the answer is known, the answer agent replies to the participant with the known answer 440. Otherwise, the answer agent may not respond to the participant 441, for instance, leaving the question unanswered. In such a case, another participant, or the moderator, may choose to answer the question and, for instance, mark the question as answered 450. The answer agent may identify the provided answer and store the answer and question in the answer database 460, after which the answer agent may wait for a next question to process 470.

Exemplary embodiments of further computing environments to implement one or more aspects of the present invention are described below with reference to FIGS. 5-7.

Figure 5:
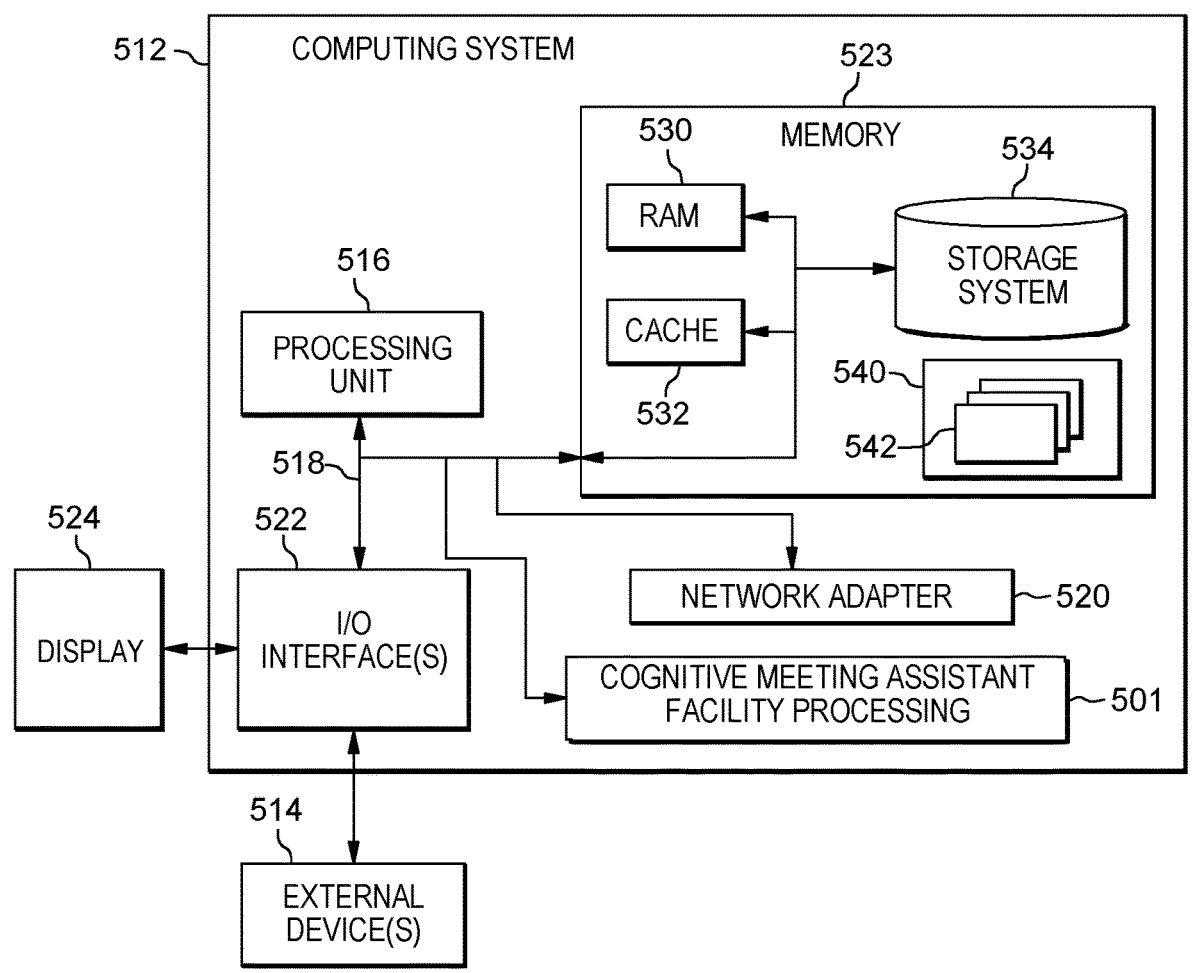
FIG. 5 depicts a further embodiment of a computing system which may incorporate cognitive meeting assistance processing, in accordance with one or more aspects of the present invention.

By way of further example, FIG. 5 depicts one embodiment of a computing environment 500, which includes a computing system 512. Examples of well-known computing systems, environments, and/or configurations that may be suitable for use with computer system 512 include, but are not limited to, a desktop computer, a workstation, a handheld or laptop computer or device, a mobile phone, a programmable consumer electronic device, a tablet, a personal digital assistant (PDA), and the like.

Computing system 512 may be described in the general context of computer system-executable instructions, such as program modules, being executed by a computer system. Generally, program modules may include routines, programs, objects, components, logic, data structures, and so on that perform particular tasks or implement particular abstract data types.

As depicted in FIG. 5, computing system 512, is shown in the form of a general-purpose computing device. The components of computing system 512 may include, but are not limited to, one or more processors or processing units 516, a system memory 523, and a bus 518 that couples various system components including system memory 523 to processor 516.

In one embodiment, processor 516 may be based on the z/Architecture® offered by International Business Machines Corporation, or other architectures offered by International Business Machines Corporation or other companies. z/Architecture® is a registered trademark of International Business Machines Corporation, Armonk, N.Y., USA. One embodiment of the z/Architecture® is described in "z/Architecture®Principles of Operation," IBM Publication No. SA22-7832-10, March 2015, which is hereby incorporated herein by reference in its entirety.

In other examples, it may be based on other architectures, such as the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA. Other names used herein may be registered trademarks, trademarks, or product names of International Business Machines Corporation or other companies.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 512 may include a variety of computer system readable media. Such media may be any available media that is accessible by computing system 512, and it includes both volatile and non-volatile media, removable and non-removable media.

System memory 523 can include computer system readable media in the form of volatile memory, such as random access memory (RAM) 530 and/or cache memory 532. Computing system 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 518 by one or more data media interfaces. As described below, memory 523 may include at least one program product having a set (e.g., at least one) of program modules that are configured to carry out the functions of embodiments of the invention.

Program/utility 540, having a set (at least one) of program modules 542, may be stored in memory 532 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein. Alternatively, a separate, cognitive meeting assistant facility, system, module, logic, etc., 501 may be provided within computing environment 512.

Computing system 512 may also communicate with one or more external devices 514 such as a keyboard, a pointing device, a display 524, etc.; one or more devices that enable a user to interact with computing system 512; and/or any devices (e.g., network card, modem, etc.) that enable computing system 512 to communicate with one or more other computing devices. Such communication can occur via Input/Output (I/O) interfaces 522. Still yet, computing system 512 can communicate with one or more networks such as a local area network (LAN), a general wide area network (WAN), and/or a public network (e.g., the Internet) via network adapter 520. As depicted, network adapter 520 communicates with the other components of computing system, 512, via bus 518. It should be understood that although not shown, other hardware and/or software components could be used in conjunction with computing system 512. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node may include a computer system/server, such as the one depicted in FIG. 5. Computer system/server 512 of FIG. 5 may be practiced in distributed cloud computing environments where tasks are performed by remote processing devices that are linked through a communications network. In a distributed cloud computing environment, program modules may be located in both local and remote computer system storage media including memory storage devices. Computer system/server 512 is capable of being implemented and/or performing any of the functionality set forth hereinabove.

Figure 6:
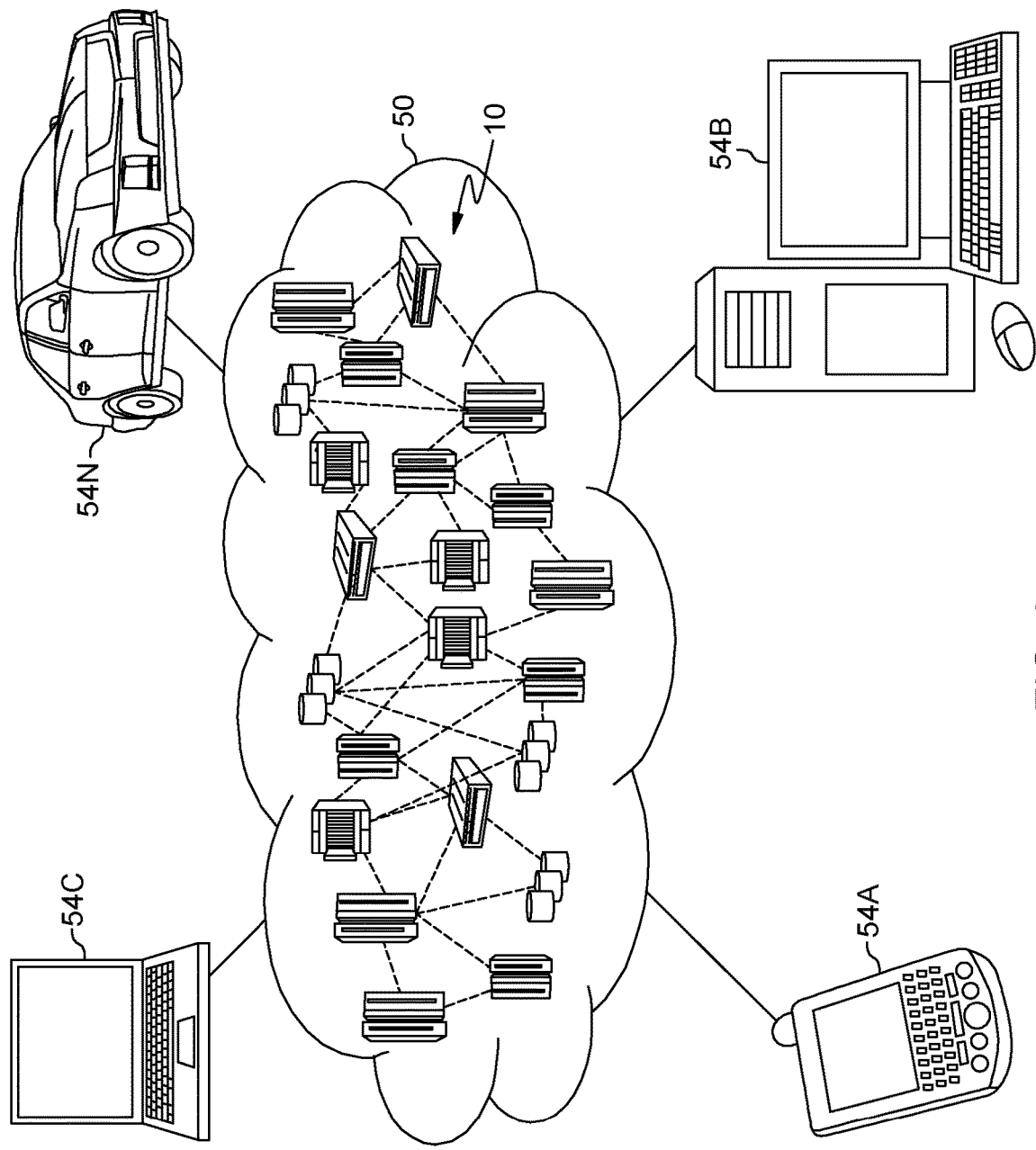
FIG. 6 depicts one embodiment of a cloud computing environment, which may facilitate implementing, or be used in association with, one or more aspects of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring to FIG. 7, a set of functional abstraction layers provided by cloud computing environment 50 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive meeting assistant facility processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computer-implemented method comprising:
  processing a plurality of chat questions received, via one or more communication devices, from participants during an online meeting, the processing including categorizing each of the plurality of chat questions received into at least one category of multiple categories, each category of the multiple categories including related chat questions of the plurality of chat questions, the processing comprising:
    determining, by at least one processor, whether content of two or more chat questions of the plurality of chat questions received is related, and based on the content being related, categorizing the two or more chat questions into a category of the multiple categories, the category of the multiple categories comprising chat questions received from different participants during the online meeting; and extracting text from the two or more chat questions within the category in addition to text from at least one answer determined to be applicable to at least one chat question of the two or more chat questions to generate a summary for the category, the at least one answer including a most probable answer provided by a question and answer system to the at least one chat question, the most probable answer being selected by the question and answer system which uses a trained model to perform ranking of possible answers and provides the most probable answer along with a confidence measure that the most probable answer correctly answers the at least one chat question, the generating the summary including identifying, using natural language processing, key words from the extracted text from the two or more chat questions and the extracted text from the at least one answer to summarize the category;

displaying, during the online meeting, the summary in a manner set off from the two or more chat questions, where the manner in which the summary is set off from the two or more chat questions includes a collapsed panel to hide the two or more chat questions from display;

wherein the processing the plurality of chat questions received further includes obtaining, during the online meeting, a posted chat question from a participant and determining that the posted chat question includes features that overlap at least two categories of the multiple categories and based thereon providing, to the participant during the online meeting, one or more answers from each of the at least two categories;

based on providing to the participant the one or more answers from each of the at least two categories, receiving feedback from the participant, the feedback indicating which answer of the one or more answers best answers the posted chat question; and based on receiving the feedback from the participant, categorizing the posted chat question into a respective category of the at least two categories, the respective category including the answer indicated by the feedback to best answer the posted chat question.

2. The computer-implemented method of claim 1, wherein the determining, by the at least one processor, whether content of the two or more chat questions of the plurality of chat questions received is related further comprises processing text of a chat question of the plurality of chat questions received during the online meeting to determine whether the chat question of the plurality of chat questions can be clustered into an existing category of chat questions, and where determined that the chat question of the plurality of chat questions can be clustered with the existing category, placing the chat question of the plurality of chat questions into the existing category of chat questions.

3. The computer-implemented method of claim 1, wherein the summary includes a category-applicable answer automatically selected from answers to the two or more chat questions within the category.

4. The computer-implemented method of claim 3, wherein the category-applicable answer selected includes any answer flagged as a best answer, of the at least one answer, by a user selected from the group consisting of a moderator and one or more of the participants.

5. The computer-implemented method of claim 1 further comprising automatically identifying when one or more of the participants provide a participant-provided answer to one or more of the chat questions of the plurality of chat questions received during the online meeting which was previously unavailable in an answer database, and based on identifying the participant-provided answer, storing the participant provided answer in the answer database for future access by an automated answering agent.

6. The computer-implemented method of claim 1, further comprising, based on the online meeting concluding, automatically providing a report of the online meeting which includes the multiple categories of the one or more categories, the multiple categories including the generated summary of the category of the one or more categories.

7. The computer-implemented method of claim 1, wherein the determining, by the at least one processor, whether content of the two or more chat questions of the plurality of chat questions received is related includes employing, by a cluster module, unsupervised text clustering during the online meeting as chat questions of the plurality of chat questions are received.

8. The computer-implemented method of claim 7, wherein the unsupervised text clustering is selected from the group consisting of k-means clustering, hierarchical clustering, density-based clustering, multivariate clustering, normal distribution clustering, and bi-clustering.

9. The computer-implemented method of claim 1, wherein known answers to known questions are saved to a knowledge base accessible by an automated answer agent, the known answers being saved to the knowledge base by a moderator prior to starting the online meeting, and the method further comprises:

scanning, by the answer agent, the online meeting to determine whether any of the plurality of chat questions being received from the participants correspond to the known questions;

automatically referencing, by the answer agent, the knowledge database during the online meeting based on receiving the plurality of chat questions to determine whether at least one of the plurality of chat questions received corresponds a known question of the known questions; and automatically providing, by the answer agent, a known answer of the known answers in response to receiving the known question, the known answer being provided based on the answer agent having a high enough confidence level that the known answer would answer the at least one of the plurality of chat questions.

10. A system for providing cognitive meeting assistance in an online meeting, the system comprising:

a memory; and a processing circuit communicatively coupled with the memory, Wherein the system performs a method comprising:

processing a plurality of chat questions received, via one or more communication devices, from participants during an online meeting, the processing including categorizing each of the plurality of chat questions received into at least one category of multiple categories, each category of the multiple categories including related chat questions of the plurality of chat questions, the processing comprising:

determining, by at least one processor, whether content of two or more chat questions of the plurality of chat questions received is related, and based on the content being related, categorizing the two or more chat questions into a category of the multiple categories, the category of the multiple categories comprising chat questions received from different participants during the online meeting; and extracting text from the two or more chat questions within the category in addition to text from at least one answer determined to be applicable to at least one chat question of the two or more chat questions to generate a summary for the category, the at least one answer including a most probable answer provided by a question and answer system to the at least one chat question, the most probable answer being selected by the question and answer system which uses a trained model to perform ranking of possible answers and provides the most probable answer along with a confidence measure that the most probable answer correctly answers the at least one chat question, the generating the summary including identifying, using natural language processing, key words from the extracted text from the two or more chat questions and the extracted text from the at least one answer to summarize the category;

displaying, during the online meeting, the summary in a manner set off from the two or more chat questions, where the manner in which the summary is set off from the two or more chat questions includes a collapsed panel to hide the two or more chat questions from display;

wherein the processing the plurality of chat questions received further includes obtaining, during the online meeting, a posted chat question from a participant and determining that the posted chat question includes features that overlap at least two categories of the multiple categories and based thereon providing, to the participant during the online meeting, one or more answers from each of the at least two categories;

based on providing to the participant the one or more answers from each of the at least two categories, receiving feedback from the participant, the feedback indicating which answer of the one or more answers best answers the posted chat question; and based on receiving the feedback from the participant, categorizing the posted chat question into a respective category of the at least two categories, the respective category including the answer indicated by the feedback to best answer the posted chat question.

11. The system of claim 10, wherein the determining, by the at least one processor, whether content of the two or more chat questions of the plurality of chat questions received is related further comprises processing text of a chat question of the plurality of chat questions received during the online meeting to determine whether the chat question of the plurality of chat questions can be clustered into an existing category of chat questions, and where determined that the chat question of the plurality of chat questions can be clustered with the existing category, placing the chat question of the plurality of chat questions into the existing category of chat questions.

12. The system of claim 10, wherein the summary includes a category-applicable answer automatically selected from answers to the two or more chat questions within the category.

13. The system of claim 10, further comprising automatically identifying when one or more of the participants provide a participant-provided answer to one or more of the chat questions of the plurality of chat questions received during the online meeting which was previously unavailable in an answer database, and based on identifying the participant-provided answer, storing the participant provided answer in the answer database for future access by an automated answering agent.

14. The system of claim 10, further comprising, based on the online meeting concluding, automatically providing a report of the online meeting which includes the multiple categories of the one or more categories, the multiple categories including the generated summary of the category of the one or more categories.

15. A computer program product for providing cognitive meeting assistance in an online meeting, the computer program product comprising:
a computer-readable storage medium readable by a processing circuit and storing instructions for execution by the processing circuit for performing a method comprising:
processing a plurality of chat questions received, via one or more communication devices, from participants during an online meeting, the processing including categorizing each of the plurality of chat questions received into at least one category of multiple categories, each category of the multiple categories including related chat questions of the plurality of chat questions, the processing comprising:
determining, by at least one processor, whether content of two or more chat questions of the plurality of chat questions received is related, and based on the content being related, categorizing the two or more chat questions into a category of the multiple categories, the category of the multiple categories comprising chat questions received from different participants during the online meeting; and
extracting text from the two or more chat questions within the category in addition to text from at least one answer determined to be applicable to at least one chat question of the two or more chat questions to generate a summary for the category, the at least one answer including a most probable answer provided by a question and answer system to the at least one chat question, the most probable answer being selected by the question and answer system which uses a trained model to perform ranking of possible answers and provides the most probable answer along with a confidence measure that the most probable answer correctly answers the at least one chat question, the generating the summary including identifying, using natural language processing, key words from the extracted text from the two or more chat questions and the extracted text from the at least one answer to summarize the category;
displaying, during the online meeting, the summary in a manner set off from the two or more chat questions, where the manner in which the summary is set off from the two or more chat questions includes a collapsed panel to hide the two or more chat questions from display;
wherein the processing, the plurality of chat questions received further includes obtaining, during the online meeting, a posted chat question from a participant and determining that the posted chat question includes features that overlap at least two categories of the multiple categories and based thereon providing, to the participant during the online meeting, one or more answers from each of the at least two categories;

based on providing to the participant the one or more answers from each of the at least two categories, receiving feedback from the participant, the feedback indicating which answer of the one or more answers best answers the posted chat question; and based on receiving the feedback from the participant, categorizing the posted chat question into a respective category of the at least two categories, the respective category including the answer indicated by the feedback to best answer the posted chat question.

16. The computer program product of claim 15, wherein the determining, by the at least one processor, whether content of the two or more chat questions of the plurality of chat questions received is related further comprises processing text of a chat question of the plurality of chat questions received during the online meeting to determine Whether the chat question of the plurality of chat questions can be clustered into an existing category of chat questions, and where determined that the chat question of the plurality of chat questions can be clustered with the existing category, placing the chat question of the plurality of chat questions into the existing category of chat questions.

17. The computer program product of claim 15, wherein the summary includes a category-applicable answer automatically selected from answers to the two or more chat questions within the category.

18. The computer program product of claim 15, wherein the method further comprises automatically identifying when one or more of the participants provide a participant-provided answer to one or more of the chat questions of the plurality of chat questions received during the online meeting which was previously unavailable in an answer database, and based on identifying the participant-provided answer, storing the participant provided answer in the answer database for future access by an automated answering agent.

* * * * *